United States Patent
Rau et al.

(10) Patent No.: US 10,556,535 B2
(45) Date of Patent: Feb. 11, 2020

(54) ROTATABLY-MOUNTED HEADLIGHT FOR A SINGLE-TRACK MOTOR VEHICLE, AND SINGLE-TRACK MOTOR VEHICLE WITH A ROTATABLY-MOUNTED HEADLIGHT

(71) Applicant: Bayerische Motoren Werke Aktiengesellschaft, Munich (DE)

(72) Inventors: Steffen Rau, Baar-Ebenhausen (DE); Friedrich Vilsmeier, Essenbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/039,881

(22) Filed: Jul. 19, 2018

(65) Prior Publication Data
US 2018/0319316 A1    Nov. 8, 2018

Related U.S. Application Data

(63) Continuation of application No. PCT/EP2016/081832, filed on Dec. 20, 2016.

(30) Foreign Application Priority Data

Jan. 21, 2016   (DE) .......................... 10 2016 200 829

(51) Int. Cl.
*B60Q 1/12* (2006.01)
(52) U.S. Cl.
CPC ..................... *B60Q 1/12* (2013.01)
(58) Field of Classification Search
CPC ............... B60Q 1/115; B60Q 2300/13; B60Q 2300/132; B60Q 2300/134; B60Q 2300/136; B60Q 1/12; B60J 6/02
See application file for complete search history.

(56) References Cited

U.S. PATENT DOCUMENTS 3,939,339 A * 2/1976 Alphen .................. B60Q 1/076
362/467
5,426,571 A    6/1995 Jones
(Continued)

FOREIGN PATENT DOCUMENTS

DE         102 48 445 A1    5/2003
DE    10 2004 061 483 A1    6/2006
(Continued)

OTHER PUBLICATIONS

International Search Report (PCT/ISA/210) issued in PCT Application No. PCT/EP2016/081832 dated Feb. 23, 2017 with English translation (seven pages).
(Continued)

*Primary Examiner* — Robert J May
(74) *Attorney, Agent, or Firm* — Crowell & Moring LLP

(57) ABSTRACT

A headlight for a single-track motor vehicle has a support part, a light module which is connected to the support part, a first bearing device, a second bearing device, and a coupling device. The light module is mounted by the first bearing device in a rotatable manner about a first main axis relative to the support part and by the second bearing device in a rotatable manner about a second main axis perpendicular to the first main axis. The coupling device couples the light module to the support part such that the light module is rotated about the second main axis during a rotation about the first main axis.

19 Claims, 3 Drawing Sheets

(56) References Cited

U.S. PATENT DOCUMENTS

2003/0072164 A1    4/2003    Watanabe et al.
2006/0083014 A1    4/2006    Kanzler et al.
2016/0339834 A1    11/2016    Oshima et al.

FOREIGN PATENT DOCUMENTS

| DE | 10 2006 034 568 A1 | 2/2007 |
| DE | 10 2005 046 037 B4 | 4/2009 |
| DE | 10 2013 216 584 A1 | 2/2015 |
| DE | 11 2015 000 584 T5 | 11/2016 |
| JP | 2008-207770 A | 9/2008 |
| WO | WO 2013/017594 A1 | 2/2013 |
| WO | WO 2015/115319 A1 | 8/2015 |

OTHER PUBLICATIONS

German-language Written Opinion (PCT/ISA/237) issued in PCT Application No. PCT/EP2016/081832 dated Feb. 23, 2017 (five pages).

German-language Search Report issued in counterpart German Application No. 10 2016 200 829.3 dated Nov. 16, 2016 with partial English translation (10 pages).

\* cited by examiner

ROTATABLY-MOUNTED HEADLIGHT FOR A SINGLE-TRACK MOTOR VEHICLE, AND SINGLE-TRACK MOTOR VEHICLE WITH A ROTATABLY-MOUNTED HEADLIGHT

CROSS REFERENCE TO RELATED APPLICATIONS

This application is a continuation of PCT International Application No. PCT/EP2016/081832, filed Dec. 20, 2016, which claims priority under 35 U.S.C. § 119 from German Patent Application No. 10 2016 200 829.3, filed Jan. 21, 2016, the entire disclosures of which are herein expressly incorporated by reference.

BACKGROUND AND SUMMARY OF THE INVENTION

The invention relates to a headlight for a single-track motor vehicle. The invention further relates to a single-track motor vehicle with such a headlight. In particular, the single-track motor vehicle can be a motorcycle.

With motorcycle headlights it has proved to be a disadvantage that when the motorcycle is inclined, such as for example when turning, the light distribution generated by the headlight is inclined, which causes poor illumination of the edge of the road. In order to compensate the inclination of the light distribution of a motorcycle headlight, motorcycle headlights from the prior art are known that swivel the light distribution of the headlight by means of the movement of a mirror that is additionally installed in the headlight. Owing to the swiveling of the light distribution oppositely to the inclination of the motorcycle, a so-called roll angle compensation can be achieved, so that the region in front of the motorcycle that is illuminated by the light distribution, and in particular the profile of a light-dark boundary, remains essentially unchanged. Nevertheless, because of the additionally installed mirror, such headlights require more installation space, or smaller lenses must be used to generate the light distribution.

DE 10 2013 216 584 A1 describes a headlight for a motorcycle with an optical device that is disposed in a housing of the headlight and that includes a light source and a reflector for producing a light distribution in front of the motorcycle. The light distribution can be swiveled in at least one plane running perpendicular to the direction of travel of the motorcycle. To swivel the light distribution, the optical device can be rotated relative to the housing by way of a mechanism.

It is a disadvantage of headlights for motorcycles that are known in the prior art that they cannot produce adequate light in a turn in addition to roll angle compensation.

It is therefore an object of at least some embodiments to provide a headlight for a single-track motor vehicle that enables both roll angle compensation and adequate light in a turn in a simple way.

This and other objects are achieved by a headlight for a single-track motor vehicle, comprising: a supporting part, a light module connected to the supporting part, a first bearing device, with which the light module is rotatably supported about a first main axis relative to the supporting part, a second bearing device, with which the light module is rotatably supported about a second main axis perpendicular to the first main axis, and a coupling device that couples the light module to the supporting part such that during a rotation about the first main axis, the light module is rotated about the second main axis.

According to at least one embodiment, the headlight described here for a single-track motor vehicle comprises a supporting part and a light module that is connected to the supporting part. In particular, the light module can be movably connected to the supporting part. The light module preferably includes at least one light source. For example, the light module can include a light unit for a dipped beam and/or a high beam. Furthermore, the light module can include one or more reflectors and/or a light module housing. The supporting part can, for example, be a housing or a part of a housing of the headlight. Furthermore, the supporting part can be embodied as a rack. The supporting part is preferably embodied such that it can be fastened to a frame and or to a fork of the single-track motor vehicle.

Furthermore, the headlight includes a first bearing device, with which the light module is supported so as to be rotatable about a first main axis relative to the supporting part, and a second bearing device, with which the light module is supported so as to be rotatable about a second main axis that is perpendicular to the first main axis. The first bearing device can, for example, be embodied as a rotary bearing. In particular, the first bearing device can be embodied as a roller bearing, such as for example a ball bearing or a deep groove ball bearing. Furthermore, the first bearing device can be implemented as a slide bearing. The first main axis can, for example, be formed essentially parallel to the direction of travel of a single-track motor vehicle during straight-line travel.

The second bearing device can, for example, be embodied as a rotary bearing or as a pivot bearing. Furthermore, the second bearing device can, for example, be implemented as a slide bearing or as a roller bearing, such as for example a ball bearing. The light module can, for example, be connected at the underside thereof to the second bearing device. The light module and the second bearing device connected thereto can form a unit that can be connected to the first bearing device. As a result, the first bearing device and the second bearing device can be disposed in a simple way such that the bearing devices are disposed rotated by 90° relative to each other, and the respective axes of rotation, i.e. the first main axis and the second main axis, are perpendicular to each other. Both the light module and the second bearing device are preferably embodied so as to be rotatable about the first main axis.

Furthermore, the headlight includes a coupling device that couples the light module to the supporting part such that the light module is rotated about the second main axis during a rotation about the first main axis. For example, the headlight can be embodied such that the light module is simultaneously rotated about the second main axis by the coupling device during a rotation about the first main axis. Owing to said mechanism, advantageously both roll angle compensation and a turn light function can be achieved with a headlight for a single-track motor vehicle in a simple way.

In particular, in this case it is not necessary to use a plurality of drive units for rotation about the first main axis and rotation about the second main axis. The coupling device is preferably supported both rotationally and transversally. The coupling device preferably connects the light module directly to the supporting part.

According to a further embodiment, the coupling device is embodied as a multi-part device, in particular with two parts. For example, the coupling device can have a first coupling device element and a second coupling device element that form the coupling device. The first coupling device element can, for example, be embodied as a spherical bearing, in particular as a so-called ball and socket joint or a uniball joint. The second coupling device element can, for example, be embodied as a slide bearing, such as for example as a pin bearing. The first coupling device element and/or the second coupling device element are both preferably supported rotationally and transversally. For example, the second coupling device element that is embodied as a slide bearing or as a pin bearing can be configured such that it allows both a rotary motion and an axial motion.

According to a further embodiment, the coupling device is embodied in one piece. For example, the coupling device can be an elastomer or can consist of an elastomer. Also with said embodiment, the coupling device can couple the light module to the supporting part such that during a rotation about the first main axis, the light module is also rotated about the second main axis.

According to a further embodiment, the second bearing device is supported by the first bearing device so as to be rotatable about the first main axis. For example, the second bearing device can be disposed in the first bearing device and fastened to the first bearing device.

According to a further embodiment, the headlight includes a drive unit that is embodied to bring about a rotary motion about the first main axis. For example, the drive unit can be embodied to apply the rotary motion directly to the first bearing device. The drive unit is preferably the single drive unit that brings about a rotary motion of the light modules about the first main axis and a resultant rotary motion of the light module about the second main axis. Because of the coupling device, a further drive unit can be omitted. For example, the light module is rotated both in the roll angle thereof, i.e. about the first main axis, and the normal axis, i.e. about the second main axis, if the first bearing device is rotated in the axis thereof and a rotary motion by the second bearing device is carried out by the coupling device or the suspension.

Furthermore, a single-track motor vehicle is provided that includes the headlight that is described here. The single-track motor vehicle can in particular be embodied as a motorized two-wheel vehicle, such as for example a motorcycle, a motor scooter or a moped. The single-track motor vehicle preferably has a frame and a fork, wherein the supporting part can connect the headlight rotationally fixedly to the frame and/or to the fork.

Other objects, advantages and novel features of the present invention will become apparent from the following detailed description of one or more preferred embodiments when considered in conjunction with the accompanying drawings.

Figure 1:
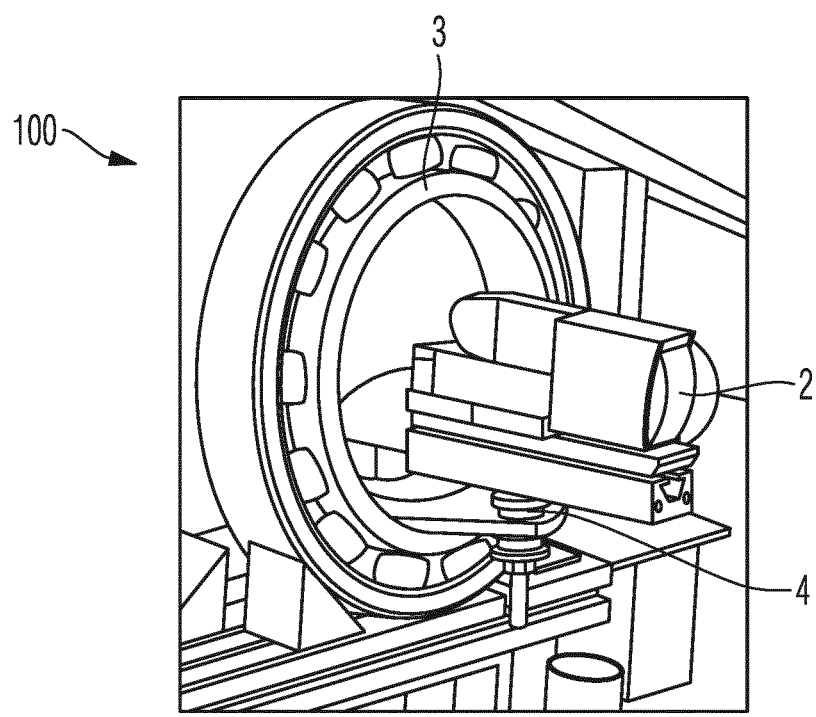
FIG. 1 is a perspective view of the front of a headlight that is described here according to an exemplary embodiment.

In the exemplary embodiments and figures, identical components or components with equivalent effect can each be provided with the same reference characters. The elements represented and the dimensional relationships to each other thereof are in principle not to be considered to be to scale. Rather, individual elements can be shown exaggerated in thickness or over-dimensioned for a better illustration and/or for better comprehension.

DETAILED DESCRIPTION OF THE DRAWINGS

Figure 2:
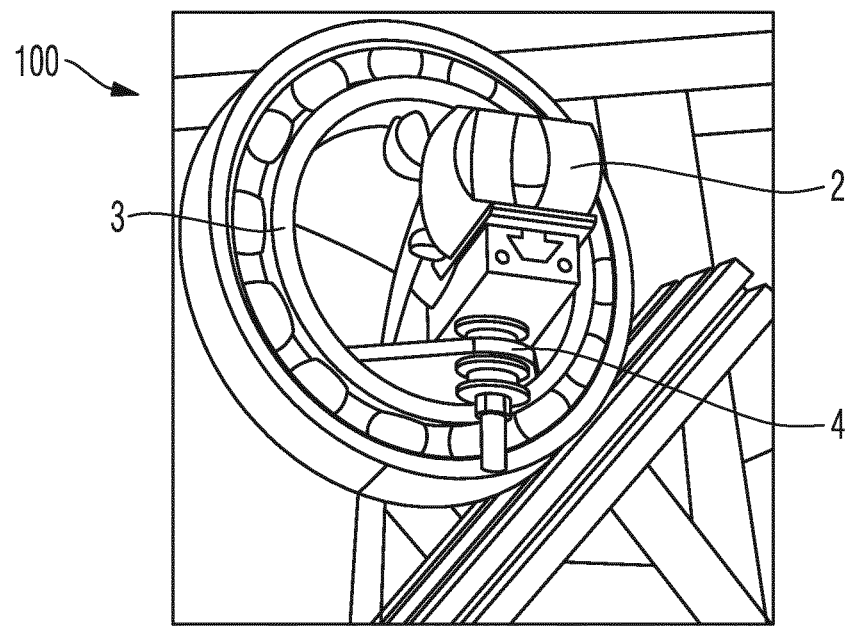
FIG. 2 is a further perspective front view of the headlight of FIG. 1.
Figure 3:
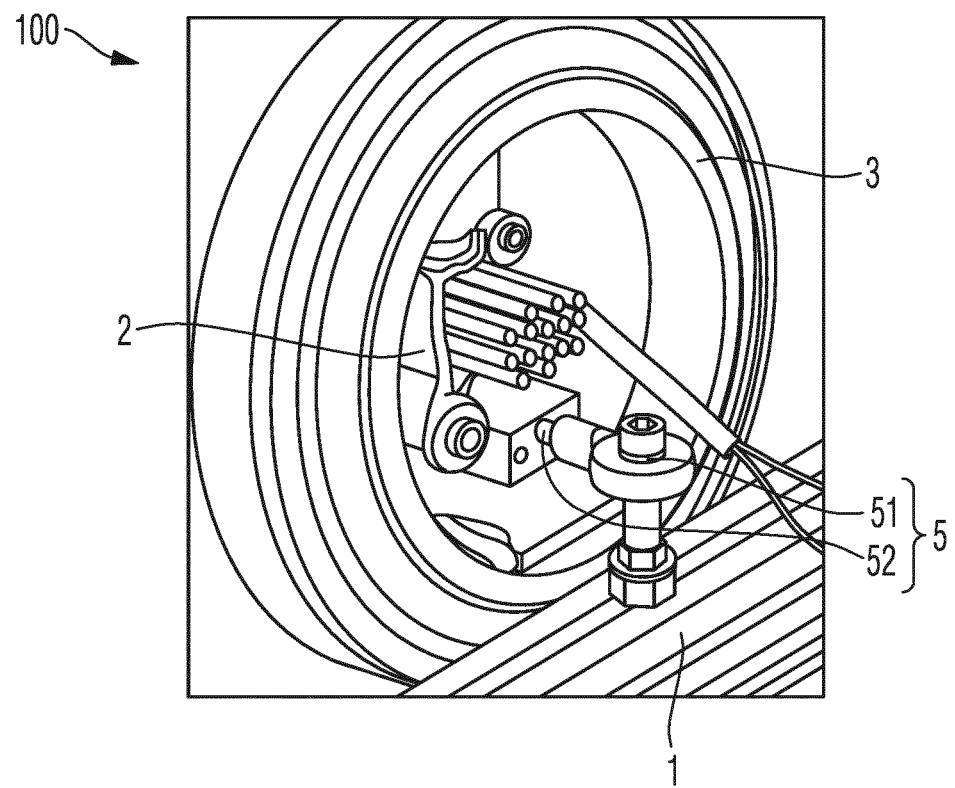
FIG. 3 is a perspective view of the rear of the headlight of FIG. 1.

FIGS. 1 through 3 show a headlight 100 for a single-track motor vehicle according to an exemplary embodiment. In this case, in FIGS. 1 and 2 a perspective view of the front of the headlight 100 is represented in each case, wherein FIGS. 1 and 2 each show different positions of the headlight 100. FIG. 3 shows a perspective view of the rear of the headlight 100.

The headlight 100 has a supporting part 1, a light module 2 connected to the supporting part 1, a first bearing device 3, a second bearing device 4 and a coupling device 5. The supporting part 1 is embodied as a rack in the exemplary embodiment shown. Alternatively, the supporting part 1 can, for example, be a housing of the headlight 100 or part of a housing of the headlight 100. The light module 2 includes a light unit for a dipped beam and a high beam.

The light module 2 has an underside that is directly connected to the second bearing device 4. The light module 2 and the second bearing device 4 form a unit that is directly connected to the first bearing device 3. The unit of the light module 2 and the second bearing device 4 is supported with the first bearing device 3 so as to be rotatable about a first main axis relative to the supporting part 1. Furthermore, the light module 2 is supported with the second bearing device 4 so as to be rotatable about a second main axis that is perpendicular to the first main axis.

In the exemplary embodiment shown, the first bearing device 3 is embodied as a ball bearing. Alternatively, the first bearing device 3 can, for example, also be a slide bearing. In the exemplary embodiment shown, the second bearing device 4 is embodied as a pivot bearing. Furthermore, the second bearing device 4 can, for example, be a slide bearing or a roller bearing.

Figure 4:
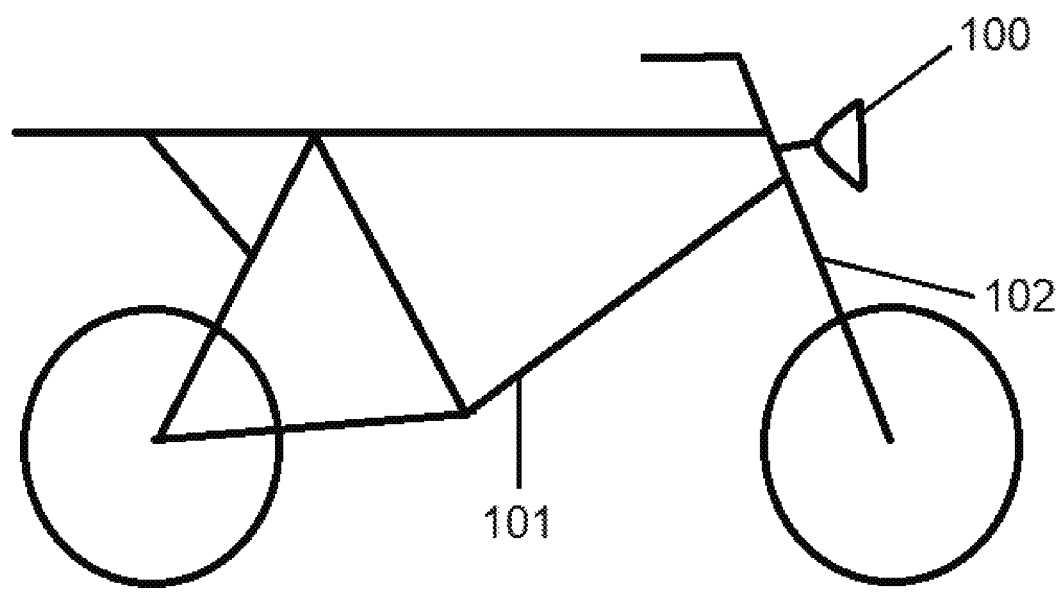
FIG. 4 is a schematic illustration of a motorcycle with the headlight of FIG. 1.

The coupling device 5 couples the light module 2 to the supporting part 1 such that during a rotation about the first main axis, the light module 2 is also rotated about the second main axis at the same time. In the exemplary embodiment shown, the coupling device 5 is embodied in two parts and includes a first coupling device element 51 and a second coupling device element 52. The first coupling device element 51 is embodied as a ball and socket joint or as a uniball joint in this case. The second coupling device element 52 is embodied as a pin bearing. Alternatively, the coupling device 5 can, for example, also be embodied in one piece and can for example consist of an elastomer. If a rotary motion about the first main axis is brought about, for example by a single drive unit, a rotary motion of the light module 2 about the second main axis is also carried out because of the bearing devices 3, 4 being connected by way of the coupling device 5. As a result, a headlight for a single-track motor vehicle can advantageously be provided that comprises both a roll angle function and a turn function. An example of such a single track vehicle is shown in FIG. 4, where the headlight 100 is mounted on a motorcycle having a frame 101 and a motorcycle fork 102.

REFERENCE CHARACTER LIST

1 supporting part
2 light module
3 first bearing device
4 second bearing device
5 coupling device 51 first coupling device element
52 second coupling device element
100 headlight
101 motorcycle frame
102 motorcycle fork The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A headlight for a single-track motor vehicle, comprising:
    a supporting part;
    a light module connected to the supporting part;
    a first bearing device, with which the light module is rotatably supported about a first main axis relative to the supporting part;
    a second bearing device, with which the light module is rotatably supported on the first bearing device about a second main axis perpendicular to the first main axis; and
    a coupling device having at a first coupling device end coupled to the supporting part, and a second coupling device end coupled to the light module at a location on the light module that is closer to the supporting part than the second bearing device, the coupling device being arranged to couple the light module to the supporting part such that during a rotation about the first main axis, the light module is rotated about the second main axis while the first coupling device end remains stationary relative to the supporting part.

2. The headlight as claimed in claim 1, wherein the first bearing device is a rotary bearing.

3. The headlight as claimed in claim 2, wherein the second bearing device is a rotary bearing.

4. The headlight as claimed in claim 1, wherein the first bearing device is a roller bearing.

5. The headlight as claimed in claim 1, wherein the first bearing device is a ball bearing.

6. The headlight as claimed in claim 1, wherein the second bearing device is a rotary bearing.

7. The headlight as claimed in claim 1, wherein the second bearing device is a pivot bearing.

8. The headlight as claimed in claim 1, wherein the coupling device is configured in two parts and comprises a first coupling device element and a second coupling device element.

9. The headlight as claimed in claim 8, wherein the first coupling device element is a spherical bearing.

10. The headlight as claimed in claim 9, wherein the second coupling device element is a slide bearing.

11. The headlight as claimed in claim 10, wherein the spherical bearing of the first coupling device element is a ball and socket joint and the slide bearing of the second coupling device element is a pin bearing.

12. The headlight as claimed in claim 1, wherein the coupling device is embodied in one piece.

13. The headlight as claimed in claim 12, wherein the coupling device comprises an elastomer.

14. The headlight as claimed in claim 1, further comprising:
    a drive unit that configured to bring about a rotary motion about the first main axis.

15. The headlight as claimed in claim 14, wherein the drive unit is configured to apply the rotary motion to the first bearing device.

16. The headlight as claimed in claim 1, wherein
    the second bearing device is fastened to the first bearing device, and
    the second bearing device is supported by the first bearing device about the first main axis.

17. The headlight as claimed in claim 1, wherein
    the supporting part is configured as a housing of the headlight or as part of a housing of the headlight.

18. A single-track motor vehicle, comprising a headlight as claimed in claim 1.

19. The single-track motor vehicle as claimed in claim 18, wherein the vehicle is a motorcycle.

* * * * *